(12) United States Patent
Lagaly et al.

(10) Patent No.: US 6,558,090 B2
(45) Date of Patent: May 6, 2003

(54) CORDLESS ROUTER

(75) Inventors: Michael Anthony Lagaly, Jackson, TN (US); James Andrew Patton, Humboldt, TN (US); Julie Lynn Jones, Jackson, TN (US)

(73) Assignee: Porter-Cable/Delta, Jackson, TN (US)

( * ) Notice: Subject to any disclaimer, the term of this patent is extended or adjusted under 35 U.S.C. 154(b) by 0 days.

(21) Appl. No.: 09/880,905

(22) Filed: Jun. 15, 2001

(65) Prior Publication Data

US 2003/0044251 A1 Mar. 6, 2003

(51) Int. Cl.⁷ .............................. B23C 1/20; B27C 5/10
(52) U.S. Cl. ................ 409/182; 144/136.95; 144/154.5
(58) Field of Search ................................. 409/181, 182; 144/135.2, 136.95, 154.5; D8/61; 310/47; 320/112; 173/217, 170

(56) References Cited

U.S. PATENT DOCUMENTS

| | | | | |
|---|---|---|---|---|
| 3,734,207 A | * | 5/1973 | Fishbein | 173/217 |
| 3,902,042 A | * | 8/1975 | Goldfarb et al. | 144/154.5 |
| 3,999,110 A | * | 12/1976 | Ramstrom et al. | 320/112 |
| 4,779,687 A | * | 10/1988 | Schreiber et al. | 173/170 |
| 5,054,563 A | * | 10/1991 | Zapf | 173/217 |
| 5,083,620 A | * | 1/1992 | Fushiya et al. | 173/217 |
| 5,298,821 A | | 3/1994 | Michel | 310/47 |
| 5,368,424 A | * | 11/1994 | Bettenhausen | 144/136.95 |
| 5,451,123 A | | 9/1995 | Fertitta, Jr. | 409/182 |
| 5,511,912 A | * | 4/1996 | Ellerbrock | 144/35.2 |
| 5,870,790 A | * | 2/1999 | Root et al. | 15/22.1 |
| 5,902,080 A | | 5/1999 | Kopras | 409/182 |
| D417,648 S | | 12/1999 | Clowers et al. | D13/103 |
| 6,050,759 A | | 4/2000 | Bone | 409/182 |
| 6,139,359 A | * | 10/2000 | Fuhreck et al. | 439/500 |
| D435,013 S | | 12/2000 | Clowers et al. | D13/103 |
| 6,223,794 B1 | * | 5/2001 | Jones | 144/135.2 |
| 6,260,591 B1 | * | 7/2001 | George et al. | 144/136.95 |
| D457,796 S | * | 5/2002 | Keith-Lucas et al. | D8/61 |

FOREIGN PATENT DOCUMENTS

GB        2331957   *  6/1999  ................. 409/182

OTHER PUBLICATIONS

Porter–Cable 1999–2000 Product Catalog, p. 65.
DeWalt High Performance Industrial Tools & Accessories 2000 Product Catalog, p. 75–76.
Makita Industrial Power Tools 1999–2000 General Catalog, p. 62.
Milwaukee Heavy Duty Electric Tools Catalog 2000, p. 116.
Bosch Power Tools & Accessories 2000 Catalog, p. 94–95.

* cited by examiner

*Primary Examiner*—William Briggs
(74) *Attorney, Agent, or Firm*—Hunton & Williams

(57) ABSTRACT

A cordless router motor unit has a metal barrel and a plastic battery housing. A DC motor is housed inside of the barrel and drives an output shaft and up to a ½" collet chuck. The battery housing holds a power switch and is fastened to the barrel. A battery is releasably attached to the battery housing through a sliding engagement in a direction normal to the longitudinal axis of the motor unit. When the battery is in its locked position relative to the battery housing, the center of gravity of the battery is balanced over the output shaft. The power switch is positioned radially from the DC motor and below the battery so that the router motor unit has a low center of gravity. The battery provides at least 18V and the maximum power output of the DC motor is at least ⅝ hp. The barrel can be sized to engage with a router base which also engages with a corded router motor unit.

23 Claims, 6 Drawing Sheets

CORDLESS ROUTER

BACKGROUND OF THE INVENTION

1. Field of the Invention

The field of this invention is portable routers.

2. Description of Related Art

Portable routers for shaping and cutting wood, plastic and other building materials are known. These tools typically have a motor unit with an AC electrical motor activated by an on/off switch. An output shaft extends from one end of the motor unit and is fitted with a collet chuck and a collet fur holding a router hit or other cutting tool. An adjustable base fits around the exterior profile of the motor unit. The axial position of the base relative to the motor unit can be adjusted through a rack and pinion or threaded arrangement disposed between the base and the motor unit. An electrical power cord extends from the motor unit to provide electrical power to the AC motor from an external power outlet. Other variations of this basic router exist and include the plunge router and the D-handle router.

All of the above described routers suffer from one common drawback—they each require an external power source and a power cord. So-called cordless power tools having a detachable battery have been produced in the form of drills, screwdrivers, saws, etc. Although several cordless routers or similar cordless tools have been proposed, e.g., in U.S. Pat. No. 6,050,759 to Bone, U.S. Pat. No. 5,902,080 to Kopras, U.S. Pat. No. 5,451,123 to Fertitta, Jr., and U.S. Pat. No. 5,298,821 to Michel, none of these proposed tools provides all of the advantageous features which are found in the cordless router of the present invention. For example, the tools proposed in these patents are not powerful enough to perform the most common router operations. The prior art patent to Michel, for example, describes the voltage of the tool proposed therein to be a maximum of 4.8V. The patent to Kopras discloses a tool with an AC electric motor adapted for 115–120V to be powered by a detachable battery. But it is completely unclear in Kopras how the detachable battery of that proposed tool would provide 115V AC.

Also, the placement of the detachable batteries on the tools proposed in these patents is not in the most advantageous position. The batteries in the prior art patents to Kopras, Fertitta Jr., and Michel attach to the tools disclosed therein by movement in a direction parallel to the longitudinal axis of the tool. Thus, if those tools were lifted longitudinally by grasping only the battery, the locking mechanism would necessarily bear the weight of the router. If the locking mechanism were to fail or were accidentally released, the tool would be dropped. The prior art patent to Bone suggests batteries which slide into the tool at an angle other than parallel to the longitudinal axis of the tool, but then the tool is not at all balanced over the output shaft.

The tools proposed in these patents also suffer from other drawbacks.

SUMMARY OF THE INVENTION

According to the invention, a cordless router may have a housing, a battery releasably attached to the housing, a locking mechanism provided on the housing for releasably retaining the battery in a locked position relative to the housing, a DC motor positioned inside the housing having a rotational axis and powered by the battery, and an output shaft powered by and extending from the DC motor having on the end thereof a tool clamping device for holding a cutting tool. The battery slides into the locked position relative to the housing in a direction substantially normal to the rotational axis. When the battery is in the locked position relative to the housing, the center of gravity of the cordless router motor unit is substantially colinear with the rotational axis of the output shaft.

According to the invention, a cordless router may also have a housing, a battery releasably attached to the housing providing a minimum voltage of at least 18V, a DC motor positioned inside the housing and powered by the battery, the DC motor having a maximum power output of at least ⅝ hp. when powered by the battery. The cordless router may also have a power switch electrically connected to the battery and electrically connected to the DC motor for turning the motor on and off, and an output shaft powered by and extending from the DC motor having on the end thereof a tool clamping device for holding a cutting tool.

According to the invention, a cordless router may also have a housing comprising a metal barrel and a plastic battery housing joined to the metal barrel with fasteners. A DC motor is disposed at least partially inside of the metal barrel and an output shaft is powered by and extends from the DC motor. The output shaft has on the end thereof a tool clamping device for holding a cutting tool. A battery is detachably mounted to the battery housing for powering the DC motor.

Also according to the invention, a cordless router may have a housing, a DC motor positioned inside the housing, a battery releasably attached to the housing so that the rotational axis of the DC motor is on a line passing through the battery, the battery powering the DC motor, an output shaft powered by and extending from the DC motor having on the end thereof a tool clamping device for holding a cutting tool, and a power switch disposed at least partially inside of the housing and having a button extending out of the housing, the power switch being radially spaced from the DC motor and positioned below the battery, the power switch controlling the passage of electrical current from the battery to the DC motor.

Also according to the invention, a cordless router may have a housing, a battery releasably attached to the housing, a DC motor powered by the battery and positioned inside the housing, and an output shaft powered by and extending from the DC motor, with the output shaft having on one end thereof a collet chuck adapted to hold router bits having a shaft diameter of at least approximately ½".

Also according to the invention, a router set may include a cordless router motor unit, a corded router motor unit, and a base. The cordless router motor unit may have a housing having a barrel with an external profile, a battery releasably attached to the housing, a DC motor supported inside the housing and powered by the battery, and an output shaft powered by and extending from the DC motor having on the end thereof a tool clamping device for holding a cutting tool. The corded router motor unit may have a housing having a barrel with an external profile, an AC motor supported inside the housing, a power cord electrically connected to the AC motor and extending from the housing for bringing electrical power from an external electrical source to power the AC motor, and an output shaft powered by and extending from the AC motor having on the end thereof a tool clamping device for holding a cutting tool. The base may have an internal surface substantially corresponding to the external profile of the barrel of the cordless router motor unit and the external profile of the barrel of the corded router motor unit, and be capable of engaging the barrel of the cordless router motor unit and moving axially thereon and also capable of engaging the barrel of the corded router motor unit and moving axially thereon.

DETAILED DESCRIPTION OF THE PREFERRED EMBODIMENTS

Figure 3:
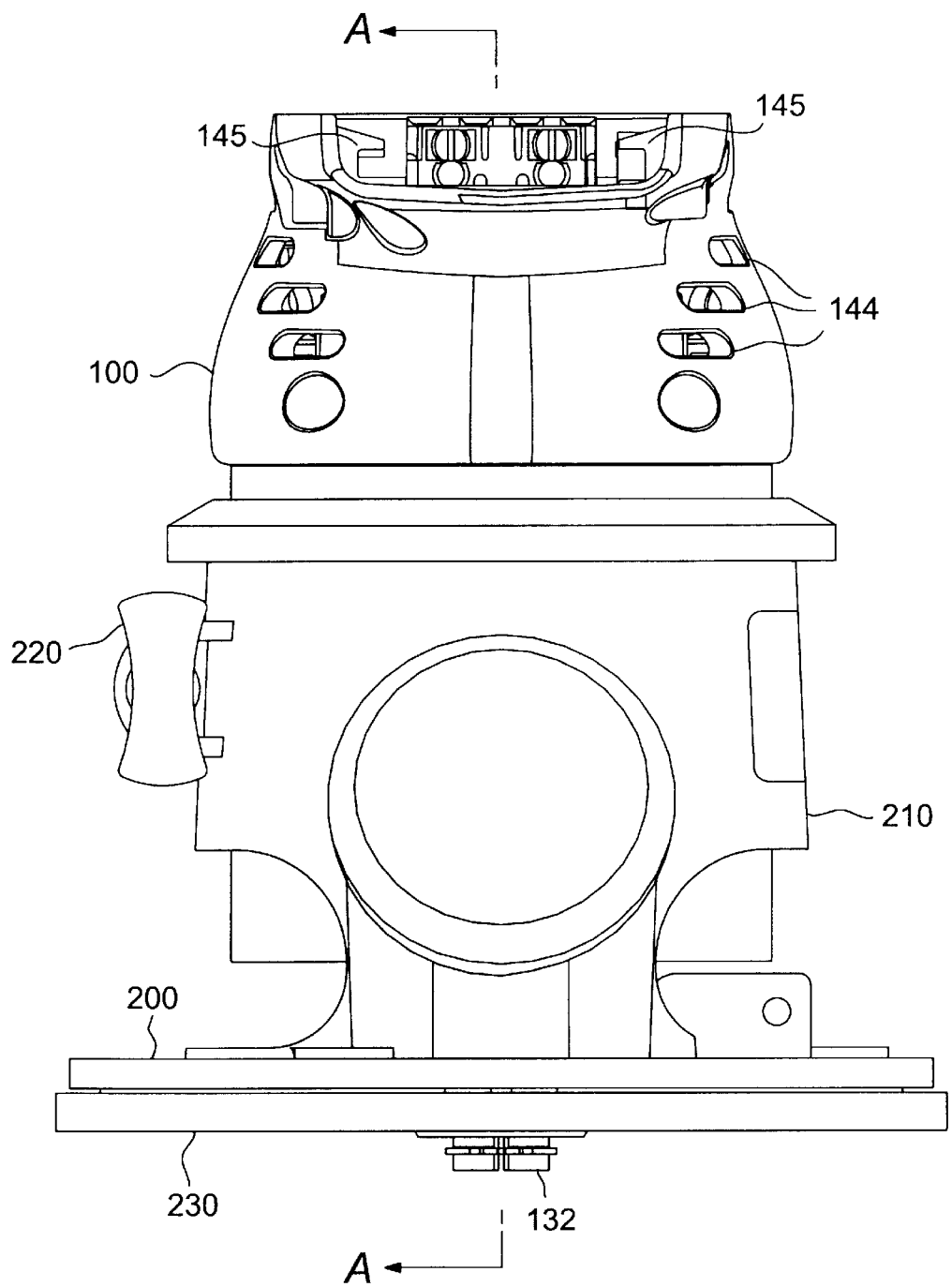
FIG. 3 is a side view of the cordless router of FIG. 1.
Figure 7:
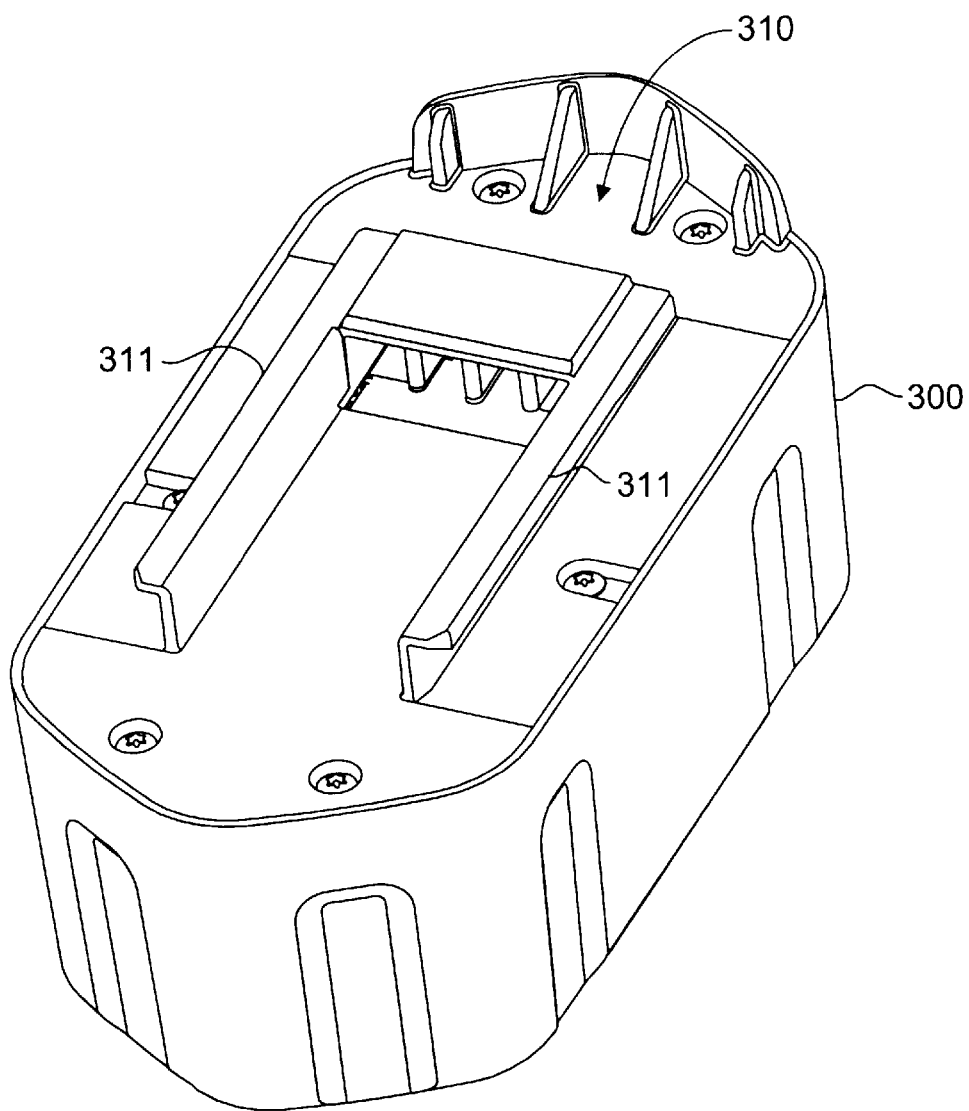
FIG. 7 is an isometric view of the detachable battery to be used with the cordless router of FIG. 1.

The cordless router has a few basic assemblies: a motor unit 100, a base 200, and a battery 300 (FIG. 7). The motor unit 100 includes a housing comprising a barrel 110 and a battery housing 140. The barrel 110 can be made from any appropriate material but is cast aluminum in a preferred embodiment to sustain the significant stresses produced in the barrel 110. Likewise, the battery housing 140 can be made from any appropriate material but is made from glass-filled nylon in a preferred embodiment to achieve an inexpensive and light weight cordless router. The base 200 and the battery 300 are releasably attached to the motor unit 100. The base 200 provides a bottom surface 230 (FIG. 3) which slides along the work piece when the router is in use.

Figure 4:
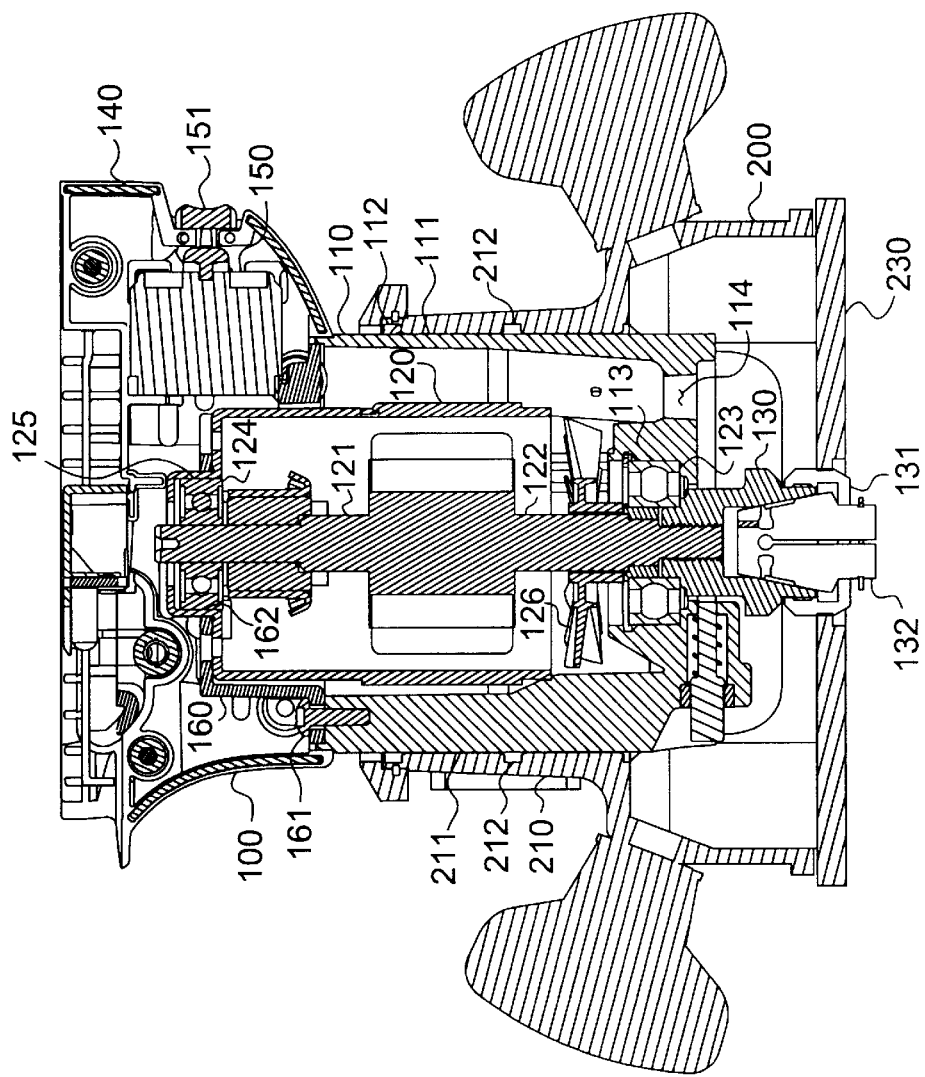
FIG. 4 is a sectional view of the cordless router taken along line A—A in FIG. 3.

The base 200 is axially adjustable relative to the motor unit 100 and can be locked into a desired axial position. As seen in FIG. 4, barrel 110 has an external profile 111. The base 200 has a skirt 210 with an inside surface 211. The inside surface 211 of the skirt 210 matches the external profile 111 of the barrel 110 so that the base 200 can engage the motor unit 100. In this embodiment, course spiral threads 212 are formed on inside surface 211. Studs 112 are provided on the external profile 111 of the barrel 110. The studs 112 ride in the course spiral threads 212 so that when the base 200 is turned relative to the motor unit 100, relative axial movement is thereby affected. A clamp 220 (FIG. 1) provided on the base 200 is tightened to lock the base 200 relative to the motor unit 100 in a known fashion. Other axial adjustment and locking mechanisms may be used such as a rack and pinion axial adjustment system.

As seen in FIG. 4, a DC motor 120 is supported in the interior of the barrel 110 and provides the cutting power for the router. The DC motor includes an armature 121 connected to an output shaft 122. A bearing 123 is fit into a boss 113 on the interior of the barrel 110 and rotationally supports the output shaft 122. The end of the output shaft 122 includes a collet chuck 130. The collet chuck 130 extends beyond the interior of the barrel 110. The collet chuck 130 includes a nut 131 and collet 132 for holding a router bit or other cutting tool in a known manner. Other types of tool holding or clamping devices may be used besides a collet chuck. In a preferred embodiment, the tool holding device is a ½" collet chuck. Other embodiments may include a ¼" or a ⅜" collet chuck. The tool holding or clamping devices may be removable from the end of the output shaft 122 to change to a different size or type of tool holding or clamping device.

At the other end of the DC motor 120, the armature 121 is supported by a bearing 124 fit into a boss 125 formed in the motor housing. A metal support plate 160 is attached to the barrel 110 by fasteners 161. The boss 125 is supported in an aperture 162 formed in the support plate 160.

Figure 6:
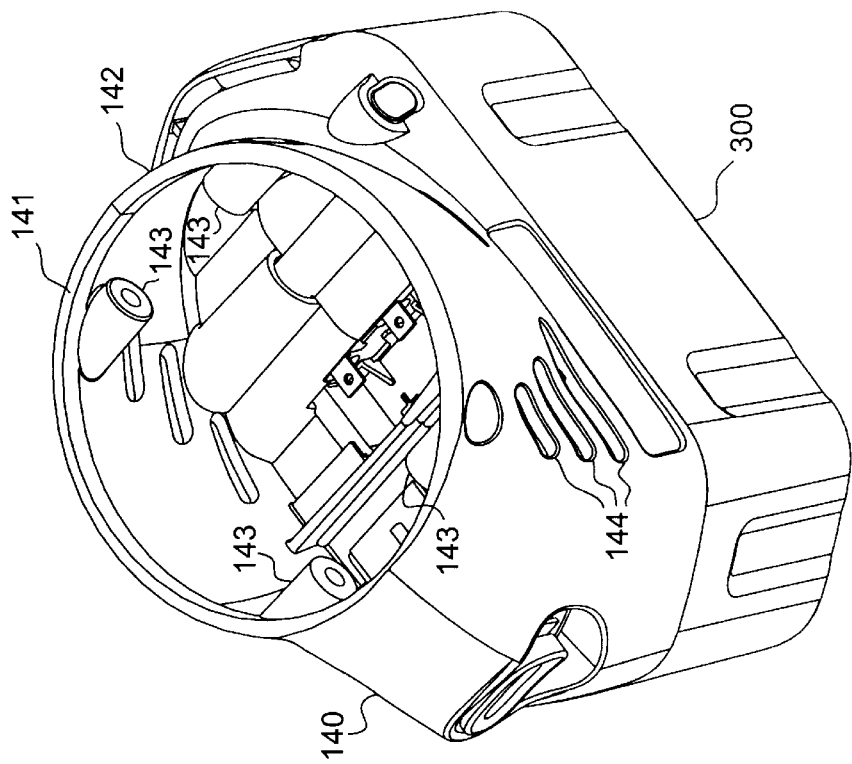
FIG. 6 is an isometric view of the battery housing of the cordless router of FIG. 1.
Figure 5:
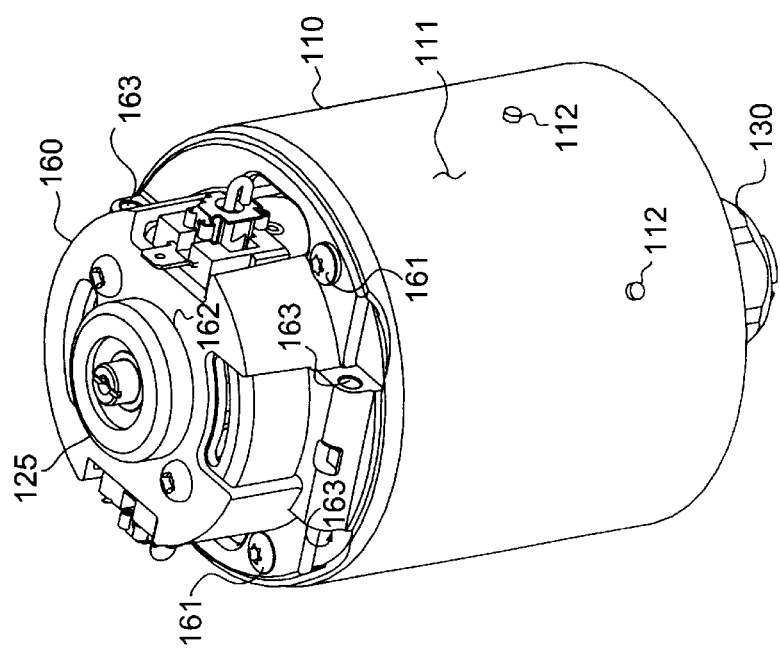
FIG. 5 is an isometric view of the motor unit of the cordless router of FIG. 1 with the battery housing removed.

The battery housing 140 is adapted to receive the detachable battery 300 and provides a structural link between the battery 300 and the motor unit 100. In a preferred embodiment, glass-filled nylon is injection molded into two clam-shell halves 141 and 142 which form the battery housing 140, as shown in FIG. 6. The two halves 141 and 142 can be fastened to one another by fasteners (not shown) passing through complementary bosses formed in each of the halves 141 and 142 in a known manner.

The battery housing 140 is connected to the barrel 110. In a preferred embodiment, threaded holes 163 are provided on support plate 160. The threaded holes 163 are in register with bosses 143 formed in the battery housing 140. When the battery housing 140 is assembled onto the barrel 110 with support plate 160, threaded fasteners (not shown) pass through each of the bosses 143 and are received in the threaded holes 163 fastening the battery housing 140 to the support plate 160.

A switch 150 is supported in the battery housing 140 in a standard manner. A battery connector 170 (FIG. 2) is also supported by the battery housing 140 in a standard manner. Battery connector 170 provides the electrical connection to the battery 300. Switch 150 controls the flow of electrical energy from the battery connector 170 to the DC motor 120. Switch 150 could also include circuitry to control the speed of the DC motor 120, as is known in the art. Switch 150 includes a button 151 which extends from the battery housing 140 and is actuated by the user to turn the router on and off.

Intake air vents 144 (FIG. 3) may be formed in the battery housing 140 in conjunction with outlet air vents 114 (FIG. 4) formed in the bottom of barrel 110. A fan 126 is driven by the output shaft 122. Cooling air is drawn from the intake air vents 144, passes through the router, and exits the outlet air vents 114. The cooling air passes by and cools the DC motor 120, the switch 150, and other electrical wiring and connections.

Figure 2:
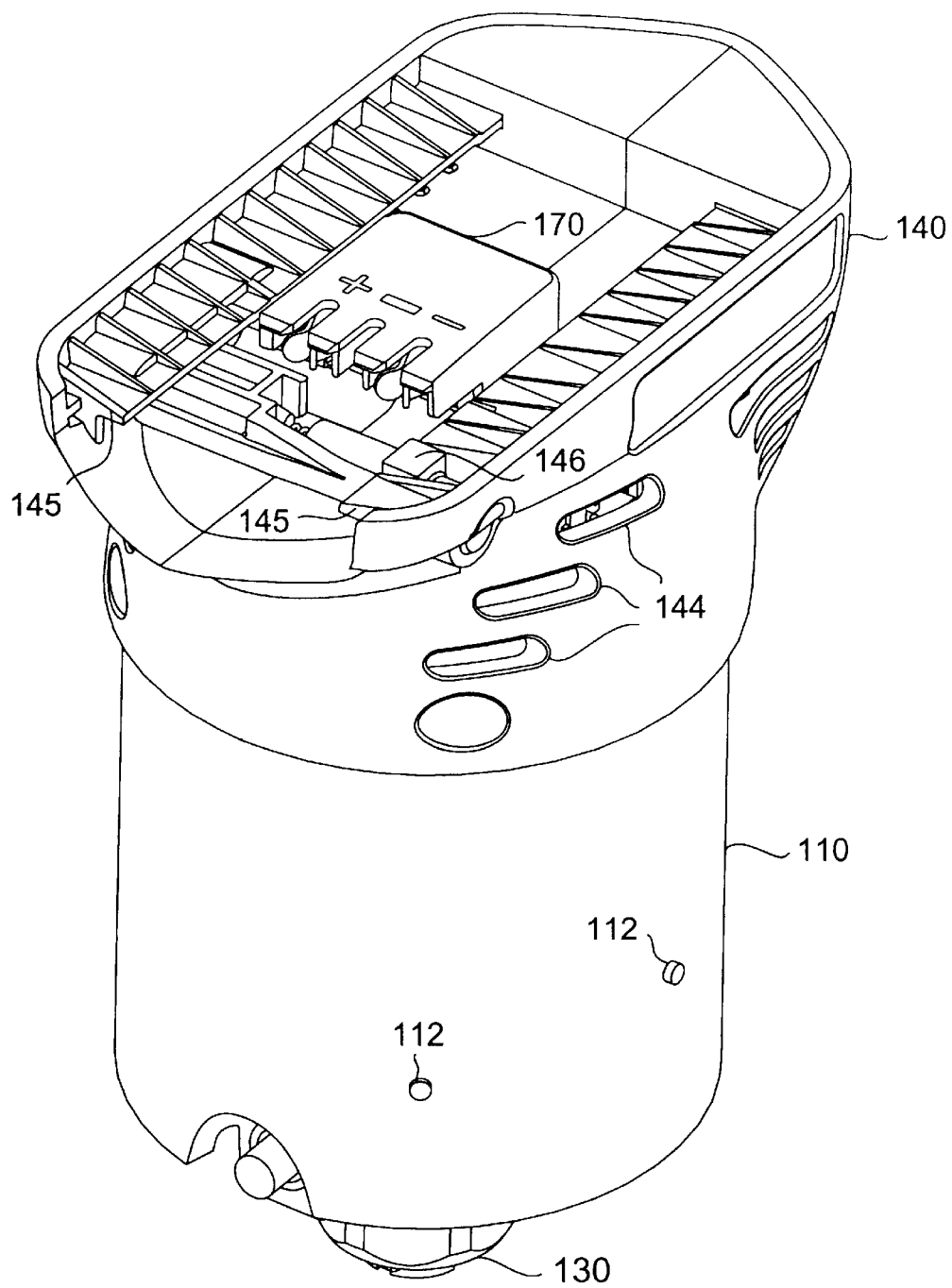
FIG. 2 is an isometric view of the motor unit of the cordless router of FIG. 1.

The battery 300 preferably slidably engages the battery housing 140 in a direction normal to the longitudinal axis of the motor unit 100, i.e., normal to the rotational axis of the DC motor 120. As seen in FIG. 7, the battery 300 includes flanges 311 extending from the connection surface 310. As seen in FIG. 2, the battery housing 140 includes shoulders 145 projecting inward toward the center of the router. To engage the battery 300 with the battery housing 140, the flanges 311 of the battery 300 engage with and slide parallel to the shoulders 145 of the battery housing 140. However, any releasable sliding connection can be used, as will be recognized by those of skill in the art.

Figure 1:
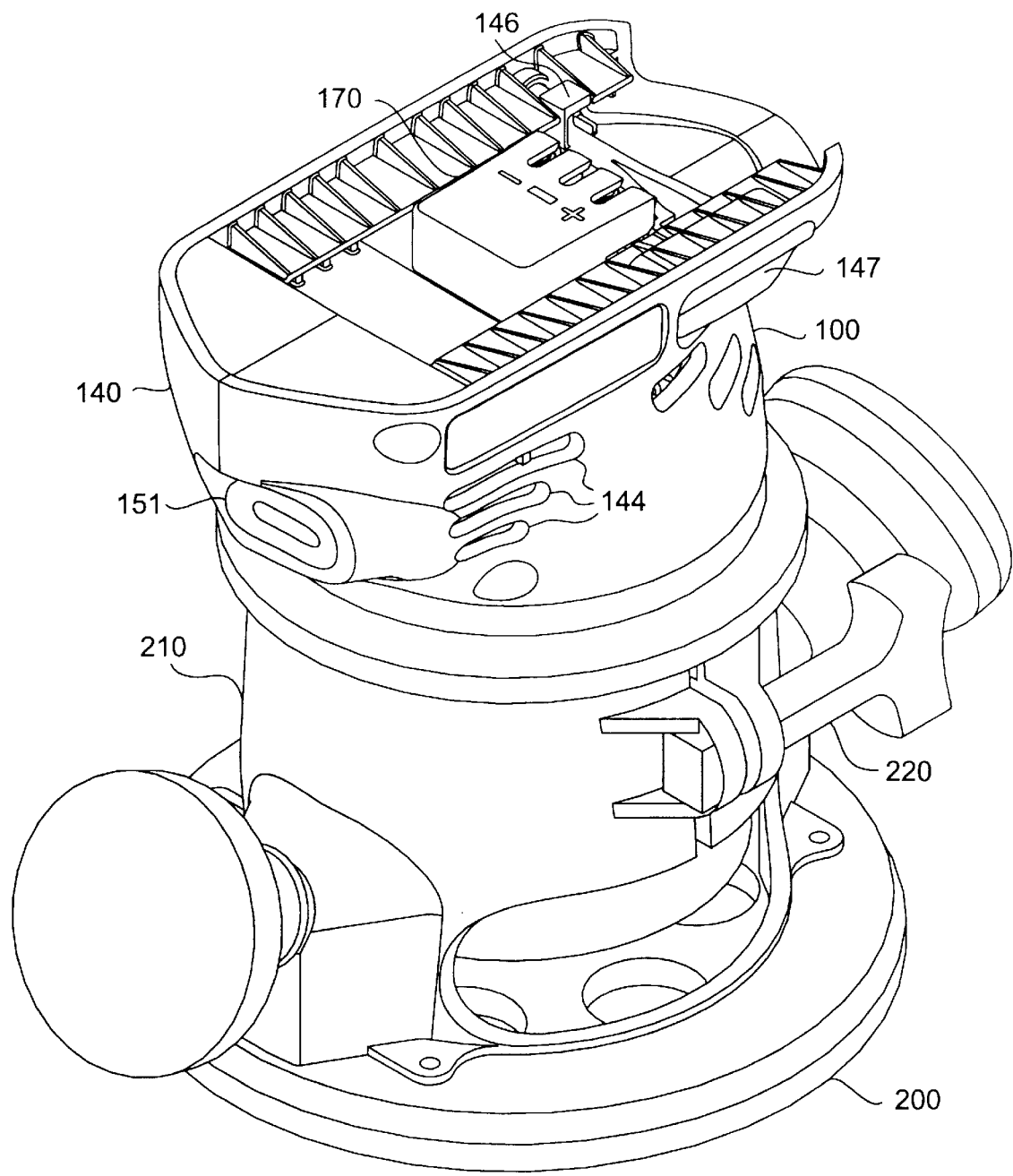
FIG. 1 is an isometric view of a cordless router shown without the detachable battery.

In cordless tools, a locking mechanism is also typically provided to retain the battery in a locked position relative to the housing, thus preventing accidental disengagement of the battery from the tool. In a preferred embodiment, a battery lock 146 is provided in the battery housing. As is known in the art, the battery lock 146 includes a camming surface which is cammed against the bias of a spring when the battery 300 is initially engaged with the battery housing 140. The battery lock 146 returns to its normal position after the battery 300 continues to slide relative to the housing 140 and finally fully engages the battery housing 140. The battery lock 146 positively holds the battery 300 in this locked position and the battery 300 can be released from this locked position by depressing a battery release button 147 (FIG. 1). Any locking mechanism for retaining the battery 300 in a locked position relative to the housing 140 may be used, as will be recognized by those skilled in the art.

This arrangement for engaging the battery 300 with the motor unit 100 is advantageous in that it provides a degree of safety in case the router is lifted by grasping the battery 300. If the user accidentally lifts the router by grasping only the battery 300, the weight of the router will be supported by the flanges 311 formed on the battery 300. The flanges 311 on the battery 300 are capable of supporting the router if necessary, although lifting the router in this fashion is not recommended. If the battery 300 were attached to the motor unit 100 by sliding the battery 300 in a direction parallel to the longitudinal axis of the router and if the router were lifted through grasping only the battery 300, then the locking mechanism provided for locking the battery 300 to the motor unit 100 would have to support the weight of the router. The locking mechanism will not typically be as capable of supporting the weight of the router as are the flanges 311 of battery 300. Also if the locking mechanism is accidentally activated while grasping the router by the battery 300, the battery may be accidentally released from the motor unit 100. Failure of the locking mechanism or accidental release of the battery 300 could cause an injury to the user or damage to the router. With the arrangement disclosed herein, if the router is lifted in this fashion, the weight of the router will not bear on the locking mechanism. This reduces the likelihood that the locking mechanism will fail or that the battery 300 will be accidentally released from the motor unit 100.

When locked onto the battery housing 140, the battery 300 is positioned so that the combination of the motor unit 100 and the battery 300 is balanced with respect to the output shaft 122. Specifically, the center of gravity of the combination of the motor unit 100 and the battery 300 is substantially colinear with the rotational axis of the output shaft 122. In the illustrated embodiment where the motor unit 100 is substantially symmetrical about the output shaft 122, this balancing is accomplished by positioning the battery 300 in its locked position so that the center of gravity of the battery 300 is substantially colinear with the rotational axis of the output shaft 122. The lack of symmetry of the switch 150 and the battery housing 140 of motor unit 100 can be neglected because their weight is small compared to the weight of the battery 300 and the DC motor 120.

Due to manufacturing tolerances and other factors, it may be difficult to position the center of gravity of the battery 300 and the motor unit 100 exactly colinear with the rotational axis of the output shaft 122. Also, if the center of gravity of the battery 300 and the motor unit 100 is positioned a relatively small distance from the rotational axis of the output shaft 122, the difference in performance of the router will be relatively small. Consequently, if the center of gravity of the battery 300 and the motor unit 100 is spaced about ¾" from the rotational axis, for example, it will still be considered to be substantially colinear. Cordless routers with the center of gravity of the battery 300 and the motor unit 100 spaced more than ¾" from the rotational axis may also be considered to be substantially colinear depending upon how much the performance of such a router departs from the ideal where the center of gravity is perfectly colinear with the rotational axis.

Balancing the center of gravity of the combination of the motor unit 100 and the battery 300 with respect to the output shaft 122 reduces the effort needed to keep the router level so that the bottom 230 remains flat on the work piece. This reduced effort in turn makes the cordless router less fatiguing to move and allows it to be manipulated more nimbly than if they were not balanced.

Also, because the cordless router is generally symmetrically balanced, and if the battery 300 has a flat top surface like the battery disclosed in U.S. Pat. No. Des. 435,013, the router can be placed upside down and will stand upright on its own. This facilitates changing the router bit and removing the base 200.

The battery 300, battery housing 140, and switch 150 are advantageously arranged so that the cordless router has a relatively low center of gravity—the center of gravity of the battery 300 being located as close as possible to the bottom 230 of base 200. To that end, switch 150 is radially spaced to the side of DC motor 120 and below the battery 300, as best seen in FIG. 4. "Radially spaced" means that a radius line (a line normal to the rotational axis) of the DC motor 120, which passes through the DC motor 120, can pass through the switch 150. "Below the battery" means that the switch 150 is generally positioned between the battery 300 and the base 200. Having a relatively low center of gravity makes manipulating and steadying the router less fatiguing. For example, the lower the center of gravity of the router, the smaller the moment that must be overcome in order to right the router on the bottom 230 if it should tip.

If the battery were a "tower"-type battery sometimes employed in cordless tools, such as that shown in U.S. Pat. No. Des. 417,648, the battery would likely either extend high above the DC motor and barrel, or would be at least partially cantilevered to the side of the barrel. Either arrangement is less advantageous than the present battery arrangement for keeping the center of gravity of the cordless router close to the bottom 230 of base 200 and balanced over the output shaft 122.

In a preferred embodiment the battery 300, DC motor 120 and other components have been designed to be capable of together producing at least ⅝ hp. maximum power output, and more preferably at least ¾ hp. maximum power output. It is thought that a maximum power output any smaller than ⅝ hp. will prevent the router from performing the necessary cutting work that a user will wish to accomplish. Thus, the battery 300 and DC motor 120 have been designed to provide an optimum ratio of weight to power. The DC motor 120 rotates at approximately 23,400 r.p.m. under no-load conditions. The DC motor 120 draws approximately 6–8 amps of current during no-load conditions, and approximately 20–35 amps during normal loading conditions.

The battery 300 is capable of providing at least approximately 18V of DC electricity. An output of less than 18V would require the DC motor 120 and other components of the router to be too large and heavy for the cordless router to be used comfortably. The battery 300 may be a single battery cell, or may be several separate cells joined in series or parallel. The preferred embodiment uses a battery 300 with several rechargeable cells joined in series with a total capacity of approximately 19.2V in a no-load, fully charged state.

The motor unit 100 can be sized and configured to engage with a base which also engages with a standard corded router motor unit. This would allow a user to purchase a single base for use with both the cordless motor unit 100 and a corded motor unit. This would also improve the utility of router tables and door hanging jigs by allowing them to be used with either a corded or cordless router motor unit. Different styles of bases, e.g. standard, D-handle, and plunge router bases, can each be sized for use with both a cordless and a corded router motor unit.

While the invention has been described in relation to preferred embodiments, the invention is not limited to these preferred embodiments. Those of skill in the art will understand that departures from the preferred embodiments can be made while still remaining within the scope of the invention, as defined by the claims below.

We claim:

1. A cordless router motor unit comprising:
   a releasably attachable battery;
   a housing having a battery mounting portion, the battery mounting portion allowing slidable attachment and detachment of the battery relative to the housing;
   a locking mechanism for releasably retaining the battery in a locked position relative to the housing;
   a DC motor positioned inside the housing and having a rotational axis, the DC motor powered by the battery;
   an output shaft powered by and extending from the DC motor having on the end thereof a tool clamping device for holding a cutting tool;
   wherein the battery slides into the locked position relative to the housing in a direction substantially normal to the rotational axis; and
   wherein when the battery is in the locked position relative to the housing, the center of gravity of the cordless router motor unit is substantially colinear with the rotational axis of the output shaft.

2. The cordless router motor unit of claim 1 wherein when the battery is in the locked position relative to the housing, the center of gravity of the cordless router motor unit is within ¾" from the rotational axis of the output shaft.

3. The cordless router motor unit of claim 1 wherein the battery mounting portion comprises a pair of flanges which engage a pair of shoulders, the flanges engaging and sliding parallel with the shoulders to engage the battery with the housing.

4. The cordless router motor unit of claim 1 further comprising:
   a power switch disposed at least partially inside of the housing and having a button extending out of the housing, the power switch being radially spaced from the DC motor and positioned below the battery, the power switch controlling the passage of electrical current from the battery to the DC motor.

5. The cordless router motor unit of claim 1 further comprising:
   a power switch electrically connected to the battery and electrically connected to the DC motor for turning the motor on and off;
   wherein the housing further comprises:
   a metal barrel, the DC motor being positioned at least partially inside of the metal barrel; and
   a plastic battery housing, the battery mounting portion formed on the plastic battery housing and the switch positioned at least partially inside of the plastic battery housing, the plastic battery housing attached to the metal barrel.

6. A cordless router motor unit comprising:
   a housing;
   a battery releasably attached to the housing providing a minimum voltage of at least 18V in a no-load, fully charged state;
   a DC motor positioned inside the housing and powered by the battery, the DC motor having a maximum power output of at least ⅝ hp. when powered by the battery;
   a power switch electrically connected to the battery and electrically connected to the DC motor for turning the motor on and off;
   an output shaft powered by and extending from the DC motor having on the end thereof a tool clamping device for holding a cutting tool; and
   wherein the housing further comprises a metal barrel, the DC motor being positioned at least partially inside of the metal barrel, and a plastic battery housing, the battery detachably mounted to the plastic battery housing and the power switch positioned at least partly inside of the plastic battery housing, the plastic battery housing attached to the metal barrel with fasteners.

7. The cordless router motor unit of claim 6 wherein the DC motor has a maximum power output of at least ⅝ hp. when powered by the battery and the battery provides a minimum voltage of at least 18V in a no-load, fully charged state.

8. A cordless router motor unit comprising:
   a housing comprising:
   a metal barrel; and
   a plastic battery housing joined to the metal barrel with fasteners;
   a DC motor disposed at least partially inside of the metal barrel;
   an output shaft powered by and extending from the DC motor having on the end thereof a tool clamping device for holding a cutting tool;
   a battery detachably mounted to the battery housing for powering the DC motor;
   an air intake vent formed in the plastic battery housing;
   an air outlet vent formed in the metal barrel; and
   a cooling fan driven by the DC motor, the cooling fan drawing cooling air into the motor unit through the air intake vent and expelling cooling air from the motor unit through the air outlet vent.

9. The cordless router motor unit of claim 1 wherein the DC motor has a maximum power output of at least ⅝ hp. when powered by the battery and the battery provides a minimum voltage of at least 18V in a no-load, fully charged state.

10. The cordless router motor unit of claim 8 further comprising:
    a metal support plate attached to an end of the barrel by fasteners wherein the battery housing is directly attached to the support plate by fasteners.

11. The motor unit for a cordless router of claim 8 wherein the metal barrel is made of aluminum and the plastic battery housing is made of glass-filled nylon.

12. The motor unit for a cordless router of claim 8 wherein the plastic battery housing comprises two clam-shell halves.

13. The motor unit for a cordless router of claim 8 wherein the metal barrel is made of magnesium.

14. A cordless router motor unit comprising:
    a housing;
    a DC motor positioned inside the housing;
    a battery releasably attached to the housing so that the rotational axis of the DC motor is on a line passing through the battery, the battery powering the DC motor;
    an output shaft powered by and extending from the DC motor having on the end thereof a tool clamping device for holding a cutting tool; and
    a power switch disposed at least partially inside of the housing and having a button extending out of the housing, the power switch being radially spaced from the DC motor and positioned below the battery, the power switch controlling the passage of electrical current from the battery to the DC motor.

15. The cordless router motor unit of claim 14 wherein the housing further composes:

a metal barrel; and a plastic battery housing joined to the metal barrel.

16. The cordless router motor unit of claim 15 wherein the button of the power switch extends out of the plastic battery housing.

17. The cordless router motor unit of claim 14 further comprising:

a locking mechanism provided on the housing for releasably retaining the battery in a locked position relative to the housing; and wherein the battery slides into the locked position relative to the housing in a direction substantially normal to the rotational axis.

18. The cordless router motor unit of claim 17 wherein when the battery is in the locked position relative to the housing, the center of gravity of the cordless router motor unit is substantially colinear with the rotational axis of the output shaft.

19. A router tool set comprising:

a cordless router motor unit comprising:
   a housing having a barrel with an external profile;
   a battery releasably attached to the housing;
   a DC motor supported inside the housing and powered by the battery;
   an output shaft powered by and extending from the DC motor having on the end thereof a tool clamping device for holding a cutting tool;

a corded router motor unit comprising:
   a housing having a barrel with an external profile;
   an AC motor supported inside the housing;
   a power cord electrically connected to the AC motor and extending from the housing for bringing electrical power from an external electrical source to power the AC motor;
   an output shaft powered by and extending from the AC motor having on the end thereof a tool clamping device for holding a cutting tool;

a base having an internal surface substantially corresponding to both the external profile of the barrel of the cordless router motor unit and the external profile of the barrel of the corded router motor unit, the base capable of engaging the barrel of the cordless router motor unit and moving axially thereon and also capable of engaging the barrel of the corded router motor unit and moving axially thereon.

20. The router tool set of claim 19 wherein the external profile of the barrel of the cordless router motor unit and the external profile of the barrel of the corded router motor unit is generally cylindrical in shape.

21. The router tool set of claim 19 wherein the housing of the cordless router motor unit further comprises:

a plastic battery housing; and the barrel is made of metal, the plastic battery housing being attached to the barrel.

22. The router tool set of claim 21 wherein the cordless router motor unit further comprises:

a power switch disposed at least partially inside of the plastic battery housing and having a button extending out of the plastic battery housing, the power switch being radially spaced from the DC motor and positioned below the battery, the power switch controlling the passage of electrical current from the battery to the DC motor.

23. The router tool set of claim 19 wherein the housing of the cordless router motor unit further comprises:

a locking mechanism for releasably retaining the battery in a locked position relative to the housing;

wherein the battery slides into the locked position in a direction substantially normal to the rotational axis of the DC motor; and wherein when the battery is in the locked position, the center of gravity of the battery is approximately colinear with the rotational axis of the output shaft of the cordless router motor unit.

* * * * *